Nov. 28, 1967  W. M. MADDEN  3,354,649
PRESSURE ACTUATED FLUID SEAL
Filed Aug. 5, 1966
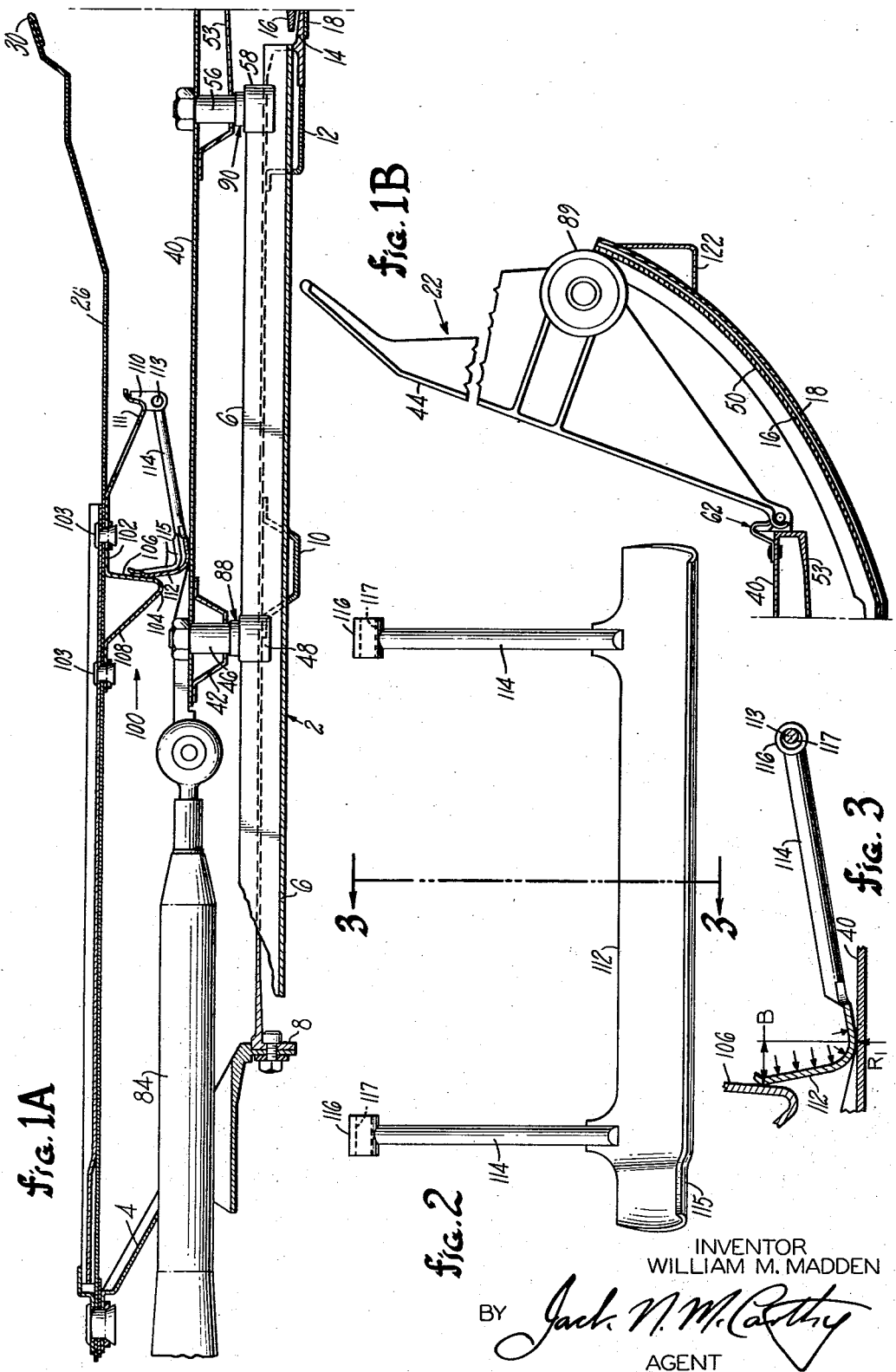
INVENTOR
WILLIAM M. MADDEN
BY
AGENT

United States Patent Office 3,354,649
Patented Nov. 28, 1967

3,354,649
PRESSURE ACTUATED FLUID SEAL
William M. Madden, Palm Springs, Fla., assignor to United Aircraft Corporation, East Hartford, Conn., a corporation of Delaware
Filed Aug. 5, 1966, Ser. No. 570,480
10 Claims. (Cl. 60—271)

This invention relates to a variable diameter, pressure operated air seal for use with an exhaust nozzle.

An object of this invention is to provide an annular air seal having hinged overlapping sealed segments which allows for relative axial motion and thermal growth between two concentric cylinders.

Another object of this invention is to provide an air seal which is biased by the fluid which it seals thereby eliminating need for springs.

A further object of this invention is to provide an air seal wherein out-of-roundness of one of two concentric cylinders to be sealed can be taken care by varying the number of segments used.

Another object of this invention is to provide an air seal wherein the direction of loading of the seal keeps support members thereof in tension allowing a simple and lightweight construction.

A further object of this invention is to provide "sloppy" hinge connections to permit floating seal segments.

Other objects and advantages will be apparent from the following specification and drawings.

FIGURES 1A and 1B combine to show the lower rear portion of an engine exhaust duct and nozzle therefor with operating mechanism.

FIGURE 2 is a detailed drawing of one of the seal segments and guide rods.

FIGURE 3 is a view taken along the line 3—3 of FIGURE 2 showing portions of the mating sealing surfaces.

As viewed in FIGURES 1A and 1B, only a small section of the engine and nozzle is shown. An engine of the type which could be used is shown in U.S. Patent No. 2,974,480 and in U.S. Patent No. 3,062,003. Both of these patents show a nozzle construction which is similar to that in this application. In FIGURE 1A, we see a burner duct 26 through which the engine exhaust gases pass. Duct 26 is of circular cross section and terminates in a circular outlet at the downstream end 30. The gas passing through duct 26 is discharged out of the engine through exhaust nozzle 22. For a more particular and detailed description of an aircraft engine, see U.S. Patents 2,700,946; 2,711,631 and 2,715,311.

Surrounding the end of the burner duct 26 is a compound nozzle supporting member 2 which is fixed at its forward end to the burner duct 26 by a rearwardly and outwardly extending flange 4. Mounted around the member 2 are a plurality of longitudinal tracks 6 of U-shaped cross section with the open end facing inwardly towards the duct 26. A flange 8 is formed at the forward end of the supporting member 2 for stiffening and is also the flange used to be connected to a mating flange on the free end of the large flange 4. A band 10 encircles the center of the supporting member 2 to supply rigidity in this area, and a box member 12 is formed at the rearward end for rigidity and stiffening. This box member 12 has a rearwardly extending annular flange 14 which fits between two plates 16 and 18 of a contoured cam surface 50. The cam surface 50 can be a large annular member having a track for each of the flaps 44 of the exhaust nozzle 22 as will be hereinafter disclosed or it can be made up of a plurality of small cam surfaces held together by a ring 122 at their outer ends.

Each track 6 serves to guide two aligned roller means 88 and 90, one connected at each end of a sleeve 40 which serves as a part of a nozzle actuating mechanism. Each roller means 88 is located at the forward end of the sleeve 40 where an annular band 42 is fixed to and extends around the sleeve. The roller means comprises a sleeve 46 fixed at one end to the sleeve 40 and at the other end to the outermost portion of the band 42. A shaft is fixed within said sleeve 46 with a roller 48 located thereon for rotation. Each roller means 90 is located at the rearward end of the sleeve 40 where an annular band 53 is fixed to and extends around the sleeve. The roller means comprises a sleeve 56 fixed at one end to the sleeve 40 and at the other end to the outermost portion of the band 53. A shaft is fixed within said sleeve 56 with a roller 58 located thereon for rotation. It is the two rollers 48 and 58 which are positioned within the upstanding arms of the U-shaped portion of each track 6.

The exhaust nozzle 22 is made up of a plurality of circumferentially spaced flaps 44 of equal size which are located around the downstream end 30 of the duct 26. Each flap 44 has a roller 89 thereon which rides in its cooperating track on cam surface 50 or cooperating small cam surface having a track. Operation of these flaps is set forth in the two patents referred to above showing the general flap configuration.

A plurality of piston members 84 have their free ends connected to the forward end of said sleeve 40 to move it axially by an actuating means, not shown. This can be a cylinder and piston unit or any other means desired. The forward ends of each of the flaps 44 are connected to the rear end of the sleeve 40 by a universal joint 62 to provide for misalignment.

As sleeve 40 moves axially between its rearward position shown in FIGURE 1A and its forward position, it is necessary for optimum engine performance that it be sealed with duct 26. Therefore, a variable diameter pressure operated air seal 100 is located between duct 26 and axially movable sleeve 40. This seal comprises a stationary annular seal member 102 extending around the outer surface of the duct 26. This seal member is fixed to the duct 26 by rivets 103. This member 102 comprises an annular portion 104 which provides a solid annular sealing surface 106 around the duct 26 which extends in substantially a radial direction. The annular portion also includes an annular support ring 108 which extends from the duct 26 to the outer end of the sealing surface 106. The rear portion of the member 102 has a rearwardly and outwardly extending flange 111 onto which a plurality of pairs of brackets 110 are connected to form hinge points having hinge pins 113 for movable seal segments 112. Surface 106 is formed as an arc with the center of the hinge pin 113 forming the approximate center as shown in FIGURE 3.

Each seal segment 112 is formed having two rearwardly extending arms 114 having bosses 116 with holes 117 therethrough to align with a pair of adjacent brackets 110 so that the pin 113 of each cooperating bracket 110 can pass through the hole 117 of a boss so that the segment 112 can be mounted to the duct 26. Each hole 117 has a larger diameter than the mating hinge pin 113 to allow for positive sealing of the end portion of each seal segment 112 with annular sealing surface 106. In an engine constructed having a burner duct with a diameter of approximately 51.5", thirty seal segments were placed around the fixed duct on the pairs of brackets 110 on flange 111. It can be seen that this number can vary depending on the size of the duct 26 and the tendency of the duct to become out-of-round. The greater the tendency, the more segments are necessary. As seen in FIGURE 2, one end of each sealing portion of the seal segment 112 is necked down as at 115 to fit under and have sliding engagement with the next adjacent sealing surface of the next seal segment 112.

The normal reaction indicated by $R_1$ in FIGURE 3 can be varied by changing the distance B. This can be used to control the wear between the sealing surface of seal segment 112 and sleeve 40. The pressure of fluid between duct 26 and sleeve 40 entering from the rear of the engine acts against the rearward surface of the seal segments 112 and provides the force to maintain the sealing surfaces of each seal segment 112 in place against the annular sealing surface 106 and the sleeve 40 and the bosses 116 against the hinge pins 113.

It is to be understood that the invention is not limited to the specific embodiment herein described, but may be used in other ways without departure from its spirit as defined by the following claims.

I claim:
1. In combination:
  (1) a first circular duct,
  (2) a second circular duct being located around and spaced from said first duct,
  (3) said ducts being mounted for relative axial movement,
  (4) means sealing the annular opening between the first duct and second duct, said means including:
    (a) an annular seal means extending outwardly from the first duct,
    (b) bracket means connected to said first duct and located around one side of said annular seal means,
    (c) a plurality of cooperating seal segments pivotally mounted to said bracket means and extending around the annular opening between said first duct and second duct with one side of each segment having contact with said second duct and with the annular seal means, and
    (d) said other side of each segment being connected to an operating pressure to keep the one side forced against the second duct and annular seal means.

2. In combination:
  (1) a first circular duct,
  (2) a second circular duct being located around and spaced from said first duct,
  (3) said ducts being mounted for relative axial movement,
  (4) means sealing the annular opening between the first duct and second duct, said means including:
    (a) a solid annular surface extending outwardly from the first duct,
    (b) bracket means connected to said first duct,
    (c) a plurality of cooperating seal segments extending around the annular opening between said first duct and second duct with one side of each segment having contact with said second duct and with the annular surface,
    (d) said bracket means having pairs of hinge pins equally spaced around one side of said annular surface,
    (e) each seal segment having means for pivotally mounting it to a pair of hinge pins, and
    (f) said other side of each segment being connected to an operating pressure to keep the one side forced against the second duct and annular surface.

3. In combination:
  (1) a first circular duct,
  (2) a second circular duct being located around and spaced from said first duct,
  (3) said ducts being mounted for relative axial movement,
  (4) means sealing the annular opening between the first duct and second duct, said means including:
    (a) a solid annular sealing surface extending outwardly from the first duct,
    (b) a plurality of cooperating seal segments extending around the annular opening between the first and second ducts having contact with said second duct and with the annular sealing surface,
    (c) means mounting said seal segments to said first duct so that one side of each segment contacts said second duct and annular surface for sealing, and
    (d) said other side of each seal segment being subjected to the pressure of fluid existing between the first circular duct and second circular duct so that the pressure will act against this other side to maintain the seal segments in sealing position.

4. A combination as set forth in claim 3 wherein (4) (c) includes pivotal mounting of the seal segments, said first duct having a plurality of hinge pins located therearound for each seal segment, and each seal segment having arms extending therefrom with their ends being pivotally connected to cooperating hinge pins to allow for proper movement of the seal segments.

5. A combination as set forth in claim 4 wherein the ends of the arms pivotally connected to the hinge pins have a loose fit so that the arms will not prevent the pressure between the first circular duct and second circular duct from positively seating the seal segments against the second circular duct and annular surface.

6. A combination as set forth in claim 4 wherein (4) (a) the solid annular sealing surface is curved having as the center of curvature approximately the center of the hinge pins.

7. A combination as set forth in claim 3 wherein (4) (a) the solid annular sealing surface is supported by an annular member connected to its outer end and to another location on the first duct.

8. In combination:
  (1) a first circular duct having an outlet at one end for directing a fluid flow therefrom,
  (2) a second circular duct being located around and spaced from said first duct,
  (3) nozzle means connected to one end of said second duct for varying the effective size of the outlet of said first circular duct,
  (4) said second duct being mounted for axial movement to actuate said nozzle means,
    (a) movement of said nozzle means controlling the pressure of the fluid entering the annular space between the first duct and second duct,
  (5) means sealing the annular opening between the first duct and second duct, said means including:
    (a) a solid annular sealing surface extending outwardly from the first duct,
    (b) a plurality of cooperating seal segments extending around the annular opening between the first and second ducts having contact with said second duct and with the annular sealing surface,
    (c) means mounting said seal segments to said first duct so that one side of each segment contacts said second duct and annular surface for sealing, and
    (d) said other side of each seal segment being subjected to the pressure of fluid existing between the first circular duct and second circular duct depending on nozzle means position so that the pressure will act against this other side to maintain the seal segments in sealing position.

9. In combination:
  (1) a combustion chamber comprising a first circular duct having a gas outlet,
  (2) nozzle means extending around the end of said circular duct to vary the opening of the gas outlet of the first circular duct,
  (3) connecting means having one end connected to said nozzle means and the other end connected to an actuator for moving said nozzle means, (a) said connecting means comprising a second circular duct mounted for axial movement around and spaced from said first circular duct, (4) means sealing the annular opening between the first circular duct and the second circular duct,
   (a) an annular sealing surface extending outwardly around the first circular duct,
   (b) a plurality of cooperating seal segments extending around the annular opening between the first duct and second duct having contact with said second duct and with the annular sealing surface,
   (c) means mounting said seal segments to said first duct to permit the one side of each segment to contact said second duct and annular surface, and
   (d) said other side of each seal segment facing the nozzle means so that the pressure of fluid existing between the first circular duct and second circular duct will act against this other side to maintain the seal segments in sealing position.

10. A combination as set forth in claim 9 wherein (4) (c) includes two hinge pins fixed to said first duct for each seal segment, each of said seal segments having two arms spaced apart with their free ends fitted around said hinge pins to provide pivotal movement, said fitted free ends having a loose fit to permit the seal segments to position themselves and properly seal themselves by the pressure exerted from between the two ducts.

References Cited
UNITED STATES PATENTS

| | | | |
|---|---|---|---|
| 2,972,226 | 2/1961 | Geary | 239—265.39 |
| 3,044,258 | 7/1962 | Carlton et al. | 239—265.33 |
| 3,302,889 | 2/1967 | Di Sabato | 239—265.39 |

CARLTON R. CROYLE, *Primary Examiner.*